US008644202B2

(12) United States Patent
Ginzburg et al.

(10) Patent No.: US 8,644,202 B2
(45) Date of Patent: *Feb. 4, 2014

(54) TECHNIQUES FOR MANAGEMENT OF SHARED RESOURCES IN WIRELESS MULTI-COMMUNICATION DEVICES

(75) Inventors: Boris Ginzburg, Haifa (IL); Sharon Ben-Porat, Nes-Ziona (IL); Oren Kaidar, Binyamina (IL); Shlomo Avital, Jerusalem (IL); Avishay Sharaga, Beit Nehemya (IL); Sridharan Sakthivelu, Dupont, WA (US); Eran Friedlander, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,637

(22) Filed: Nov. 10, 2011

(65) Prior Publication Data

US 2012/0057552 A1 Mar. 8, 2012

Related U.S. Application Data

(63) Continuation of application No. 12/215,360, filed on Jun. 25, 2008, now Pat. No. 8,072,912.

(51) Int. Cl.
*H04W 72/00* (2009.01)
*H04W 48/18* (2009.01)

(52) U.S. Cl.
USPC .......................................... 370/310; 370/465

(58) Field of Classification Search
None
See application file for complete search history.

(56) References Cited

U.S. PATENT DOCUMENTS

| 7,054,290 B1 | 5/2006 | Djuphammar |
| 7,701,913 B2 * | 4/2010 | Chen et al. .................... 370/338 |
| 2003/0193923 A1 | 10/2003 | Abdelgany et al. |
| 2004/0029619 A1 | 2/2004 | Liang et al. |

(Continued)

FOREIGN PATENT DOCUMENTS

| JP | 2009518963 A | 5/2009 |
| WO | 2007070409 A1 | 6/2007 |

OTHER PUBLICATIONS

International Search Report in related application PCT/US2009/047319, mailed Dec. 18, 2009.

(Continued)

*Primary Examiner* — Min Jung
(74) *Attorney, Agent, or Firm* — Pillsbury Winthrop Shaw Pittman LLP

(57) ABSTRACT

An embodiment of the present invention provides an apparatus, comprising a network adapter configured for wireless communication using more than one technology, and wherein the network adapter is configured to share a plurality of shared hardware components by limiting access to the air to one comm only at given time by designating one comm that owns the shared hardware components as a primary comm and all other comms are secondary comms, wherein the primary comm allows the secondary comms to use the shared hardware components when it is in an idle-state but when the primary comm returns from the idle state, it claims ownership of the shared resources and the secondary comms release the shared resources.

12 Claims, 3 Drawing Sheets

(56) References Cited

U.S. PATENT DOCUMENTS

| | | |
|---|---|---|
| 2005/0059347 A1 | 3/2005 | Haartsen |
| 2005/0159180 A1 | 7/2005 | Cheng et al. |
| 2005/0271010 A1 | 12/2005 | Capretta |
| 2007/0135162 A1 | 6/2007 | Banerjea et al. |
| 2007/0155344 A1 | 7/2007 | Wiessner et al. |
| 2008/0198824 A1* | 8/2008 | Wu et al. ........................ 370/338 |
| 2008/0285504 A1* | 11/2008 | Lin ............................... 370/319 |
| 2009/0016296 A1 | 1/2009 | Jechoux et al. |
| 2009/0088089 A1* | 4/2009 | Chandra et al. ............... 455/101 |
| 2012/0225654 A1* | 9/2012 | Junela et al. ............... 455/435.2 |

OTHER PUBLICATIONS

Taiwanese Office Action corresponding to Taiwanese Application No. 98120467, dated Jul. 22, 2012, 8 pages.

Japanese Office Action with English translation corresponding to Japanese Application No. 2011-502146, dated Jun. 26, 2012, 7 pages.

The Notice of Final Rejection/The Notice of Preliminary Rejection, Korean Patent Application No. 2010-7021211 (now registered as Korean Patent No. 10-1195350, Publication Date: Oct. 26, 2012), mail date of May 15, 2012, total of 9 pages.

Japanese Office Action, Japanese Application No. 2011-502146, mail date Apr. 9, 2013, total of 9 pages.

\* cited by examiner

US 8,644,202 B2

TECHNIQUES FOR MANAGEMENT OF SHARED RESOURCES IN WIRELESS MULTI-COMMUNICATION DEVICES

CROSS-REFERENCE TO RELATED APPLICATIONS

This application is a continuation of U.S. patent application Ser. No. 12/215,360 filed Jun. 25, 2008, now U.S. Pat. No. 8,072,912 the contents of which are hereby incorporated by reference in their entirety.

BACKGROUND

As wireless communication technology evolves and improves, different wireless communication technologies must coexist in a given platform. As different wireless communication technologies may have benefits and superior performance in a particular usage scenario, it is advantageous to enable multiple wireless communication technologies to be used for a particular device. Further, different wireless comms (also referred to herein as wireless communications) might share some of the hardware components on the device (such radio, antennas etc). Sharing hardware components might limit the usage of the device in a way that at a given time only one of the wireless comms can use the hardware to transmit or receive.

Thus, it would be advantageous to improve the ability for wireless devices and apparatus to share hardware components when multiple communication technologies coexist.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
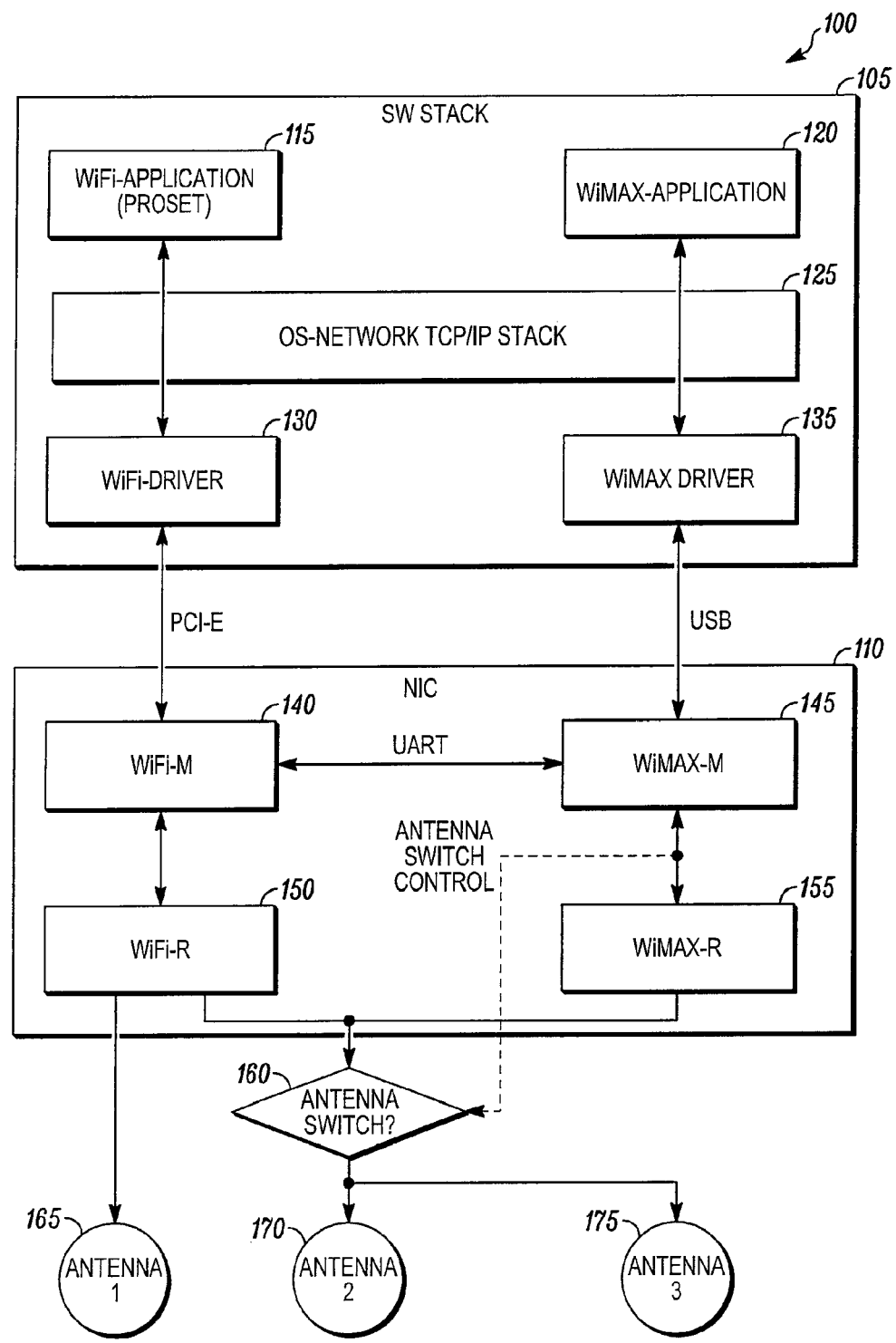
FIG. 1 illustrates an example of a WiFi-WiMAX combo device with distributed management utility of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A wireless multicomm device as described herein may be a network adapter that combines more then one wireless technology (each wireless technology may be referred as a "comm"). The different wireless comms might share some of the hardware components on the device (such radio, antennas etc)—it is understood that this list is not exhaustive of the hardware components that may be shared. Sharing hardware components might limit the usage of the device in a way that at a given time only one of the wireless comms can use the hardware to transmit or receive.

As used herein, in an embodiment of the present invention, the term "multicomm device" also may provide a wireless-multicomm device with shared hardware (HW) that limits the access to the air to one comm only at a given time.

Looking now at FIG. 1, shown generally as 100, is an example of WiFi-WiMAX combo device with a distributed management utility. Software (SW) stack 105 may be interfaced with network interface controller (NIC) 110 via USB or PCI-E bus. The MC may be in communication with antenna switch 160, antenna 1 165, antenna 2 170 and antenna 3 175.

SW stack 105 may include WiFi application 115 in communication with WiFi driver 130 and WiMAX application 120 in communication with WiMAX driver 135 via OS—network TCP/IP stack 125. A MC of an embodiment of the present invention may include WiFi-M 140 in communication with WiFi driver 130 via PCI-E and further in communication with WiFi-R 150 on said NIC. WiFi-M 140 may further be hi communication with WiMax-M via UART (it is understood that the present invention is not limited in this respect) which may be in communication with WiMAX driver 135 via USB. WiMAX-M 145 on NIC 110 may also be in communication with WiMAX-R 155 with antenna control existing therebetween, which may be in direct communication with antenna switch 160—again, it is understood that the present invention is not limited to this architecture.

Figure 2:
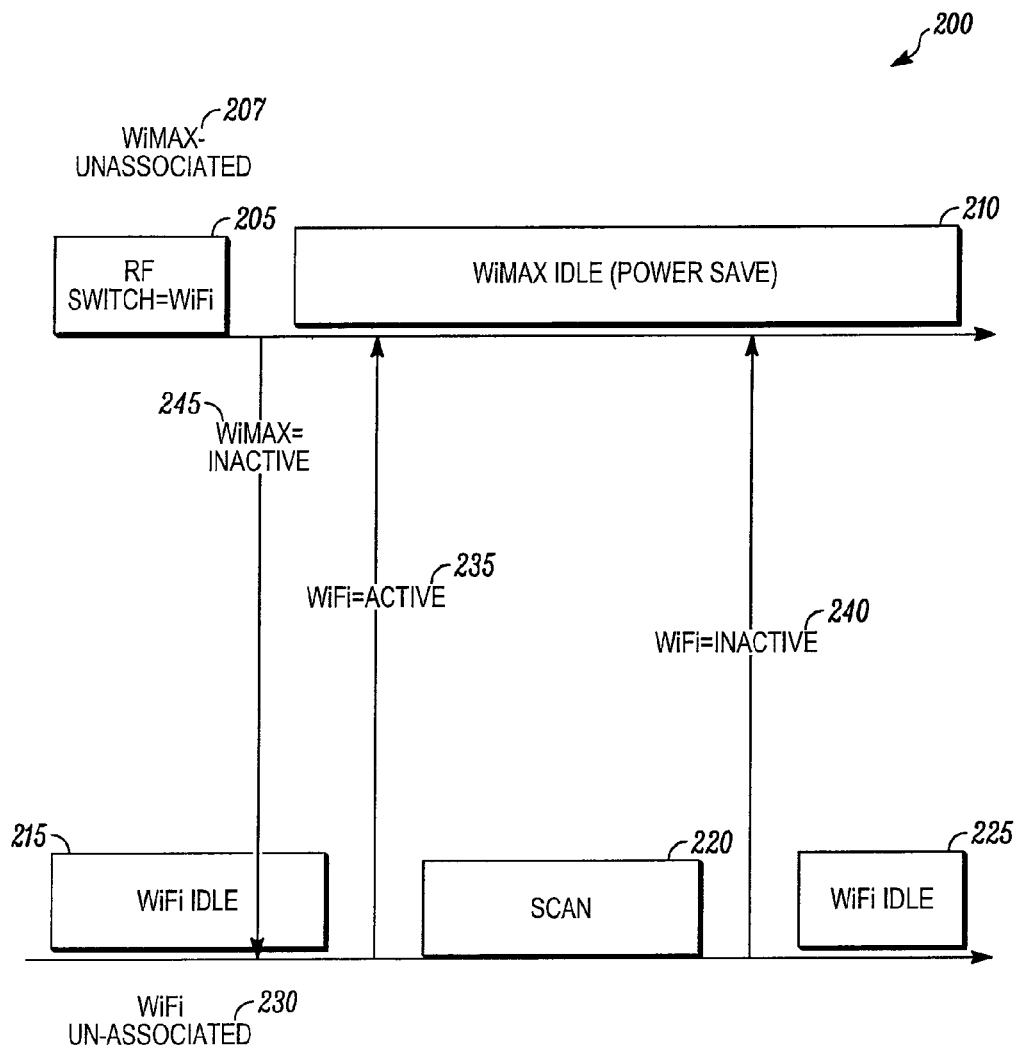
FIG. 2 shows a typical WiFi scan while WiMAX is idle.

Turning now to 200 of FIG. 2 is a depiction of a typical WiFi scan 220 while WiMAX is idle 210. Embodiments of the present invention provide a method to manage the shared resources on multicomm device. The method may include:

1. The comm that owns the shared resources is defined as primary comm (comm-1). The primary comm allow other comms (secondary comms) to use these resources when it is in an Idle-State 210. As used herein, but not limited in this respect, Idle is a state where the associated comm does not need the shared resources in order to maintain its association. It may be, but is not limited to, a state that is defined by a wireless standard such as WiMAX-Idle 210, or WiFi Power Save 215 and 225. In FIG. 2, WiMAX unassociated is shown at 207, WiFi unassociated is shown at 230. Further, WiMAX inactive is shown at 245, WiFi active is depicted at 235 and WiFi inactive at 240.

2. The secondary comms may use the shared resources, for example scanning 220 while idle, calibration while idle etc.

3. When the primary comm owner returns from Idle to active state (for example it needs the resources to maintain its association) it claims ownership of the resources. The secondary comms release the shared resources which at 205 depicts RF switch=WiFi.

Figure 3:
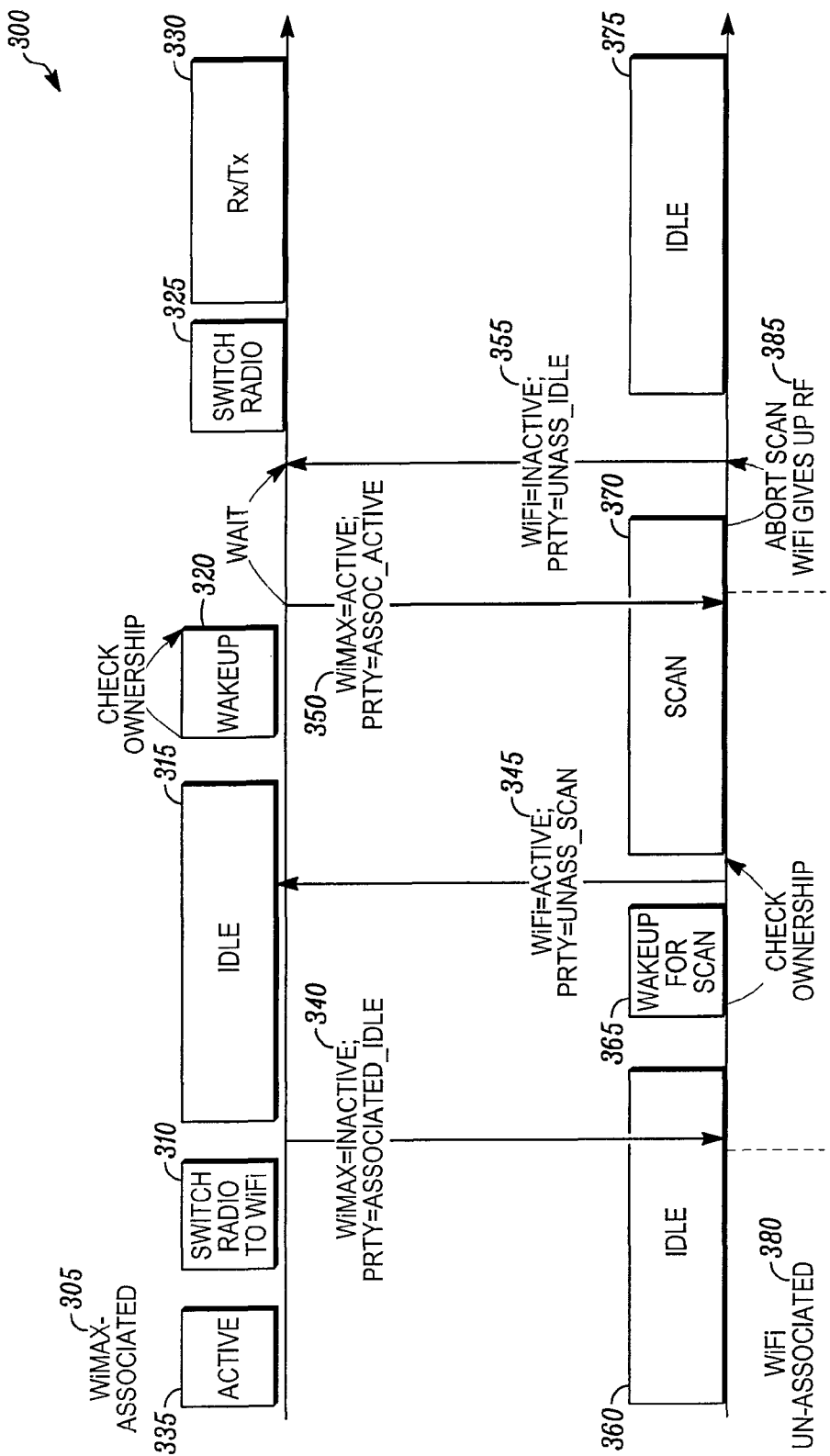
FIG. 3 depicts an example of the implementation of a WiFi scan while WiMAX is idle of an embodiment of the present invention.

Turning now to FIG. 3, generally depicted as 300, is an example of an implementation of a WiFi scan 370 while WiMAX idle 315 of an embodiment of the present invention.

The "Scan while idle" flow is intended for the WiFi to take advantage of the WiMAX idle time, for the WiFi to scan for available networks. From that scan, provide the application layer with the available scan list, allow the application to apply a WiFi profile and then from that create a WiFi connection (note that this will cause the WiMAX to break its connection). An embodiment of the present invention may provide the following flow:

1. WiMAX—idle associated 315. WiMAX before going to idle—switched radio to WiFi 310 and sends message "WiMAX=INACTIVE, priority =idle" to WiFi. WiMAX active is shown at 335 with Switch radio to WiFi at 310 with message to WiFi of "WiMAX=Inactive Priority=associated idle" at 340. Wake up scan is shown at 365.

2. WiFi is unassociated (also idle) 380. WiFi CM decides that it wants to scan for available WiFi networks and sends request to WiFi driver. The driver also maintains an internal un-associated scan schedule. The WiFi driver sends scan request, WiFi=active, Priority=unassociated scan" sent at 345 to comm.

3. Driver distinguishes between manual scan, and background scan. The Driver indicates scan priority in the scan request command sent to the comm.

4. Comm wakes up 320 for the scan request and indicates priority of unassociated scan according to the scan request type. Comm shall request the RF with {priority, active} tuple.

5. Comm performs priority resolution, and checks whether it is entitled to the radio ownership 365:
   a. If the radio is owned by the WiFi, then the WiFi immediately starts scanning procedure.
   b. If the radio is owned by WiMAX, and the WiMAX priority is higher then the WiFi, then the WiFi shall refrain from starting the scanning procedure, and shall indicate a scan abort indication to the Driver 385: "WiFi=inactive, Priority=unassociated idle" 355. Switch radio is shown at 325 and receive/transmit at 330.
   c. If the radio is owned by WiMAX, and the WiMAX priority is lower then the WiFi priority, then the WiFi shall wait for the WiMAX priority resolution to complete, and for the WiMAX to release the radio 350. Note that the WiFi shall have a timeout of a few hundreds of msec for the WiMAX to release the RF.

6. After WiFi has started the scanning it may be interrupted by the WiMAX listen action when it wakes up as part of the WiMAX idle associated state.
   a. The WiMAX shall send a {priority, active} tuple, and shall perform priority resolution. The WiFi shall also perform priority resolution after the coexistence database was updated with the WiMAX tuple. Note that the WiMAX shall need to wakeup ~150 μs prior to the actual planned wakeup time, in order to perform the priority resolution, and allow WiFi to abort the scanning operation.
   b. If the priority resolution indicates, WiFi needs to maintain ownership over the radio, the WiMAX shall abort its wakeup 320 procedure.
   c. If the priority resolution indicates WiMAX, the WiFi shall abort its scanning procedure 385, and indicate to the Driver scan aborted indication remain idle as shown at 375. Note that the next scan request from the driver shall resume from the last channel the WiFi has completed scanning successfully.

Implementing the algorithm of embodiments of the present invention will allow a user to detect wireless networks on one wireless comm, while associated to different wireless network via other comm, without breaking its association. For example if she is connected to WiMAX network and comes to office, this method will allow the multicomm device to scan the WiFi office network, w/o disassociating WiMAX, and only if such a network is found, offer the user to switch to WiFi. In contrast, multicomm devices that do not implement the present invention, will force the user to disconnect from the associated network if he/she wants to search for other networks on the other comm.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
   a network adapter configured for wireless communication using a plurality of wireless technologies including WiMAX wireless technology and WiFi wireless technology, the network adapter being configured to share a plurality of common hardware components by limiting access to a wireless medium to only one wireless technology at given time,
   wherein said WiFi wireless technology is configured to utilize a time period of a WiMAX idle state for said WiFi wireless technology to scan for one or more available networks, and provide a scan list for the one or more available networks such that one or more applications are configured to create a WiFi connection without causing said WiMAX wireless technology to interrupt a connection thereof, and
   wherein, to scan for the one or more available WiFi networks, the WiFi wireless technology is configured to send a request to an associated WiFi driver which maintains an internal un-associated scan schedule, and wake up for the scan and indicate priority of unassociated scan, according to a scan request type.

2. The apparatus of claim 1, wherein, before going to the WiMAX idle state, said WiMAX wireless technology sends a message "WiMAX=INACTIVE, priority =idle" to said WiFi wireless technology.

3. The apparatus of claim 1, wherein said network adapter performs priority resolution and checks whether each of WiMAX and WiFi wireless technologies is entitled for radio ownership and after said WiFi wireless technology has started scanning, the WiFi wireless technology being interrupted by a WiMAX listen action when the WiFi wireless technology wakes up as part of the WiMAX idle state.

4. The apparatus of claim 1, wherein, upon completion of the time period of the WiMAX idle state, the WiMAX wireless technology claims ownership of said common resources, and the WiFi wireless technology releases said common resources.

5. An method, comprising:
configuring a network adapter for wireless communication a plurality of wireless technologies including WiMAX wireless technology and WiFi wireless technology, such that said network adapter shares a plurality of common hardware components by limiting access to a wireless medium to only one wireless technology at given time, wherein said configuring the network adapter includes:
configuring said WiFi wireless technology to utilize a time period of a WiMAX idle state for said WiFi wireless technology to scan for one or more available networks, and provide a scan list for the one or more available networks such that one or more applications are configured to create a WiFi connection without causing said WiMAX wireless technology to interrupt a connection thereof; and
performing priority resolution and checking whether each of WiMAX and WiFi wireless technologies is entitled for radio ownership, wherein, after said WiFi wireless technology has started scanning, the WiFi wireless technology being interrupted by a WiMAX listen action when the WiFi wireless technology wakes up as part of the WiMAX idle state.

6. The method of claim 5, wherein configuring further comprises, sending a message "WiMAX=INACTIVE, priority =idle" by said WiMAX wireless technology to said WiFi wireless technology, before said WiMAX wireless technology enters into the WiMAX idle state.

7. The method of claim 5, further comprising performing priority resolution and checking whether each is entitled for radio ownership by said network adapter and after said WiFi wireless technology has started scanning, the WiFi wireless technology may be interrupted by a WiMAX listen action when the WiFi wireless technology wakes up as part of the WiMAX idle associated state.

8. The method of claim 5, wherein, upon completion of the time period of the WiMAX idle state, the WiMAX wireless technology claims ownership of said common resources, and the WiFi wireless technology releases said common resources.

9. An article comprising a non-transitory storage medium having stored thereon instructions, that, when executed by a computing platform, results in:
configuring a network adapter for wireless communication a plurality of wireless technologies including WiMAX wireless technology and WiFi wireless technology, such that said network adapter shares a plurality of common hardware components by limiting access to a wireless medium to only one wireless technology at given time, wherein said configuring the network adapter includes:
configuring said WiFi wireless technology to utilize a time period of a WiMAX idle state for said WiFi wireless technology to scan for one or more available networks, and provide a scan list for the one or more available networks such that one or more applications are configured to create a WiFi connection without causing said WiMAX wireless technology to interrupt a connection thereof; and
performing priority resolution and checking whether each of WiMAX and WiFi wireless technologies is entitled for radio ownership, wherein, after said WiFi wireless technology has started scanning, the WiFi wireless technology being interrupted by a WiMAX listen action when the WiFi wireless technology wakes up as part of the WiMAX idle state.

10. The article of claim 9, comprising further instructions that when executed further result in sending a message "WiMAX=INACTIVE, priority =idle" by said WiMAX wireless technology to said WiFi wireless technology, before said WiMAX wireless technology enters into the WiMAX idle state.

11. The article of claim 9, comprising further instructions that when executed further result in performing priority resolution and checking whether each is entitled for radio ownership by said network adapter and after said WiFi wireless technology has started scanning, the WiFi wireless technology may be interrupted by a WiMAX listen action when the WiFi wireless technology wakes up as part of the WiMAX idle associated state.

12. The article of claim 9, wherein, upon completion of the time period of the WiMAX idle state, the WiMAX wireless technology claims ownership of said common resources, and the WiFi wireless technology releases said common resources.

* * * * *